US012609030B2

(12) United States Patent
Feng et al.

(10) Patent No.: US 12,609,030 B2
(45) Date of Patent: Apr. 21, 2026

(54) METHOD AND SYSTEM FOR AUTOMATICALLY RECORDING AND TRANSMITTING PARKING SPACE NUMBERS

(71) Applicant: TUNG THIH ELECTRONIC CO., LTD., Taoyuan City (TW)

(72) Inventors: Te-Hsuan Feng, Taoyuan City (TW); Wen-Liang Ji, Taoyuan City (TW); Yu-Sheng Chou, Taoyuan City (TW); Fan-Sin Chen, Taoyuan City (TW); Chen-Wei Chen, Taoyuan City (TW)

(73) Assignee: TUNG THIH ELECTRONIC CO., LTD., Taoyuan City (TW)

(*) Notice: Subject to any disclaimer, the term of this patent is extended or adjusted under 35 U.S.C. 154(b) by 258 days.

(21) Appl. No.: 18/449,723

(22) Filed: Aug. 15, 2023

(65) Prior Publication Data

US 2024/0420572 A1 Dec. 19, 2024

(30) Foreign Application Priority Data

Jun. 19, 2023 (TW) ................................ 112122867

(51) Int. Cl.

| | |
|---|---|
| ***G08G 1/00*** | (2006.01) |
| ***G08G 1/01*** | (2006.01) |
| ***G08G 1/017*** | (2006.01) |
| ***G08G 1/052*** | (2006.01) |
| ***G08G 1/14*** | (2006.01) |

(52) U.S. Cl.
CPC ........... *G08G 1/144* (2013.01); *G08G 1/0112* (2013.01); *G08G 1/0125* (2013.01); *G08G 1/0175* (2013.01); *G08G 1/052* (2013.01)

(58) Field of Classification Search
CPC .... G08G 1/144; G08G 1/0112; G08G 1/0125; G08G 1/0175; G08G 1/052; G08G 1/00; G06V 20/625
USPC .......................................................... 701/117
See application file for complete search history.

(56) References Cited

U.S. PATENT DOCUMENTS

| | | | | |
|---|---|---|---|---|
| 2018/0316680 | A1* | 11/2018 | Kishikawa .......... | H04L 63/1425 |
| 2020/0120450 | A1* | 4/2020 | Lee ........................ | G08G 1/127 |
| 2021/0375135 | A1* | 12/2021 | Yang ..................... | H04W 4/029 |
| 2022/0392329 | A1* | 12/2022 | Chu ...................... | G08G 1/0175 |

* cited by examiner

*Primary Examiner* — Shardul D Patel

(57) ABSTRACT

A method for automatically recording and transmitting a parking space number, includes judging whether vehicle speed information is lower than a preset value. When it is confirmed that the vehicle speed information is lower than the preset value, a part of vehicle surrounding images of multiple vehicle surrounding images is obtained according to gear position information of the vehicle. A parking space recognition model is established according to the multiple vehicle surrounding images and recognizing multiple characters corresponding to the part of the vehicle surrounding images. The multiple characters are grouped to form multiple sets of parking space numbers corresponding to the part of the vehicle surrounding images. A priority of the multiple sets of parking space numbers is then determined. After the vehicle is turned off, the parking space number with the highest priority in the multiple sets of parking space numbers is transmitted to a user terminal.

10 Claims, 7 Drawing Sheets

METHOD AND SYSTEM FOR AUTOMATICALLY RECORDING AND TRANSMITTING PARKING SPACE NUMBERS

CROSS-REFERENCE TO RELATED APPLICATION

This non-provisional application claims priority under 35 U.S.C. § 119(a) on Patent Application No(s). 112122867 filed in Taiwan, R.O.C. on Jun. 19, 2023, the entire contents of which are hereby incorporated by reference.

BACKGROUND OF THE INVENTION

1. Field of the Invention

The present disclosure relates to a method and system for recording parking space numbers, and in particular to a method and system for automatically recording and transmitting parking space numbers.

2. Description of the Related Art

Cars are one of the indispensable means of transportation in people's lives. As the number of cars continues to increase, larger parking lots are needed. Therefore, parking lots are now designed to be large multi-story buildings to meet the parking needs for a great number of cars. For ease of management, the parking spaces of the parking lot are numbered, and the numbers are marked on positions (e.g., the ground) of each of the parking spaces. For example, the parking space number is "A001", wherein the English letter "A" indicates that the parking area is area A, and the number "001" indicates the parking space number.

However, with different parking lot management methods, the above parking space numbers will produce various types of numbers and letters. Some parking space numbers and letters are long and complex therefore these parking space numbers and letters are not easy for drivers to remember. Thus, drivers frequently forget where their vehicles are parked.

BRIEF SUMMARY OF THE INVENTION

In some parking lot management methods, when a driver drives a vehicle into a parking lot and collects a ticket, the license plate number of the vehicle is captured by a camera installed at the entrance of the parking lot. After the vehicle is parked in a parking space, the parking space number is captured by a camera installed near the parking space and recorded in the parking management system. When the driver pays the parking fee at a dedicated payment machine, the parking space number is displayed on the screen of the payment machine to remind the driver where the vehicle is parked. However, the above method requires the installation of multiple cameras in various parts of the parking lot, and the more floors and floor area of the parking lot, the number of cameras that need to be installed will also increase, which will increase the construction cost and management/maintenance cost of the parking lot. In addition, if the driver drives the vehicle into some parking lots that fail to have the above management methods, the driver has to remember the parking space number, so it is likely that the driver will forget where their vehicle is parked.

In order to solve the above problems and more, an objective of the present disclosure is to provide a method for automatically recording and transmitting parking space numbers. The method comprises the following steps: judging whether vehicle speed information is lower than a preset value; when it is confirmed that the vehicle speed information is lower than the preset value, obtaining a part of vehicle surrounding images of multiple vehicle surrounding images according to gear position information of the vehicle; establishing a parking space recognition model according to the multiple vehicle surrounding images and recognizing multiple characters corresponding to the part of the vehicle surrounding images; grouping the multiple characters to form multiple sets of parking space numbers and/or letters respectively corresponding to the part of the vehicle surrounding images; determining a priority of the multiple sets of parking space numbers and letters; and after the vehicle is turned off, transmitting the parking space number and letter with the highest priority in the multiple sets of parking space numbers and letters to a user terminal.

In some embodiments, the multiple characters are grouped by using a distance between each of the characters.

In some embodiments, the priority is determined according to the number of times that the multiple sets of parking space numbers and letters are recognized in the part of the vehicle surrounding images.

In some embodiments, the priority is determined according to installation positions of a vehicle camera module used by the multiple sets of parking space numbers in the part of the vehicle surrounding images.

In some embodiments, the priority is determined according to the time that the multiple sets of parking space numbers and letters are captured in the part of the vehicle surrounding images.

In order to solve the above problems and more, an objective of the present disclosure is to provide a system for automatically recording and transmitting parking space numbers and letters, including: a vehicle speed sensing module, used to sense a driving speed of a vehicle to obtain vehicle speed information; a gear position sensing module, used to sense a gear of the vehicle to obtain gear position information; a vehicle camera module, installed on the vehicle to obtain multiple vehicle surrounding images; an artificial intelligence module, connected with the vehicle camera module to establish a parking space recognition model according to the multiple vehicle surrounding images, and recognizes multiple characters corresponding to a part of the vehicle surrounding images of the multiple vehicle surrounding images; a character grouping module, connected with the artificial intelligence module to group the multiple characters to form multiple sets of parking space numbers corresponding to the part of the vehicle surrounding images; a control module, connected with the vehicle speed sensing module, the gear position sensing module, the vehicle camera module, the character grouping module and the artificial intelligence module to determine a priority of the multiple sets of parking space numbers and/or letters; and a communication module, connected with the control module to transmit the parking space number and/or letters with the highest priority in the multiple sets of parking space numbers to a user terminal.

In some embodiments, the character grouping module groups the multiple characters by using a distance between each of the characters.

In some embodiments, the priority is determined according to the number of times that the multiple sets of parking space numbers and letters are recognized in the part of the vehicle surrounding images.

In some embodiments, the priority is determined according to installation positions of the vehicle camera module used by the multiple sets of parking space numbers and letters in the part of the vehicle surrounding images.

In some embodiments, the priority is determined according to the time that the multiple sets of parking space numbers and letters are captured in the part of the vehicle surrounding images.

In summary, in the method and system for automatically recording and transmitting parking space numbers and letters, the control module may determine the priority according to the number of times that parking space numbers and letters are recognized in the vehicle surrounding images, the time that the parking space numbers and letters are captured, or the installation positions of the vehicle camera module, and after the vehicle is turned off, the parking space number with the highest priority in the parking space numbers and letters is transmitted to the user terminal through the communication module, thereby solving the problem that the driver forgets where their vehicle is parked. Further, the control module may obtain the part of vehicle surrounding images according to the gear position information, so as to decrease the amount of data of the vehicle surrounding images input to the control module, thereby reducing the computing load of the control module and relatively improving the computing efficiency of the control module.

DETAILED DESCRIPTION OF THE INVENTION

Figure 1:
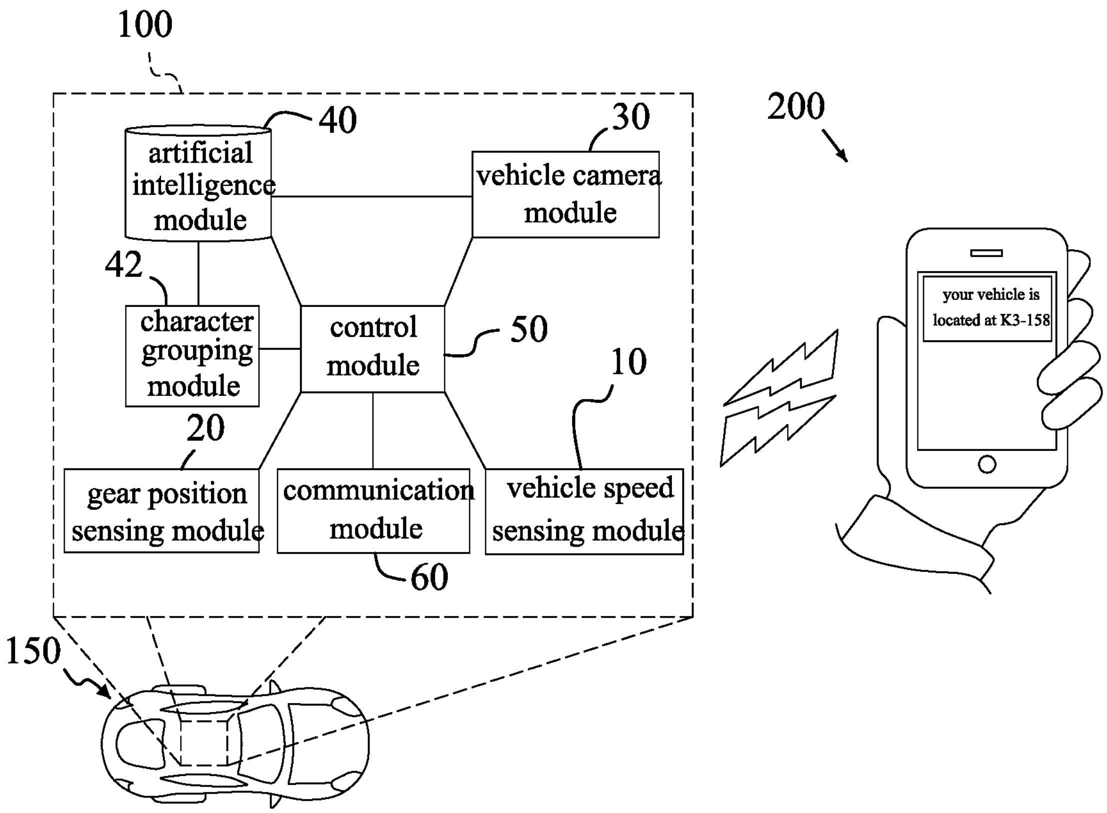
FIG. 1 is a block diagram illustrating a system for automatically recording and transmitting parking space numbers and letters according to an embodiment of the present disclosure.

Refer to FIG. 1, which is a block diagram illustrating a system for automatically recording and transmitting parking space numbers and letters according to an embodiment of the present disclosure. An automatically recording and transmitting parking space numbers and letters system 100 may be installed on a vehicle 150. An automatically recording and transmitting parking space numbers and letters system 100 includes a vehicle speed sensing module 10, a gear position sensing module 20, a vehicle camera module 30, an artificial intelligence module 40, a control module 50, and a communication module 60. The automatically recording and transmitting parking space numbers and letter system 100 can transmit a parking space number and/or letter to the user terminal 200 through the communication module 60. In some embodiments, the automatically recording and transmitting parking space numbers and letters system 100 can also be connected to the Internet (not shown in the figure) through the communication module 60, and the user terminal 200 can also be connected to the Internet. Accordingly, the automatically recording and transmitting parking space numbers and letters system 100 can transmit the parking space number(s) and/or letter(s) to the user terminal 200 through the Internet. The user terminal 200, for example, may be a handheld mobile communication device (e.g., a smartphone) or a wearable electronic device (e.g., a smartwatch), but is not limited thereto.

The vehicle speed sensing module 10 is connected to the control module 50. The vehicle speed sensing module 10 is used to sense a driving speed of the vehicle 150 to obtain vehicle speed information. The vehicle speed sensing module 10, for example, may be a wheel speed sensor or a shaft speed sensor, but is not limited thereto. For example, the vehicle speed sensing module 10 may be connected to a wheel of the vehicle 150 to sense the wheel speed and obtain vehicle speed information. In other embodiments, the vehicle speed sensing module 10 may be connected to a driveshaft of a gearbox to sense the speed of the driveshaft and obtain vehicle speed information.

The gear position sensing module 20 is connected with the control module 50. The gear position sensing module 20 is used to sense a gear of the vehicle 150 to obtain gear position information. The gear position sensing module 20, for example, may be a contact gear position sensor or a non-contact gear position sensor. For example, the gear position sensing module 20 can be connected to a gearshift mechanism of the vehicle 150 and sense a change of a mechanical position of the gearshift mechanism to obtain gear position information. In other embodiments, the gear position sensing module 20 may use magnetic induction to sense the change of the mechanical position of the gearshift mechanism to obtain gear position information. In other embodiments, the gear position sensing module 20 may use photoelectric sensing to sense the change of the mechanical position of the gearshift mechanism to obtain gear position information. The gear information may include P gear (i.e., parking gear), R gear (i.e., reverse gear), N gear (i.e., neutral gear), D gear (i.e., driving gear), third gear, second gear, and first gear, but is not limited to thereto.

The vehicle camera module 30 is connected with the artificial intelligence module 40 and the control module 50. The vehicle camera module 30 is installed on the vehicle 150. The vehicle camera module 30 can capture images around the vehicle 150 (for example, front, left, right, and/or rear) in horizontal and vertical angles of view to obtain peripheral images of the vehicle. The vehicle camera module 30, for example, may be a wide-angle camera, but is not limited thereto. In an embodiment the vehicle camera module 30 is composed of multiple wide-angle cameras. In other embodiments, the vehicle camera module 30 may also be composed of a wide-angle camera.

Figure 2:
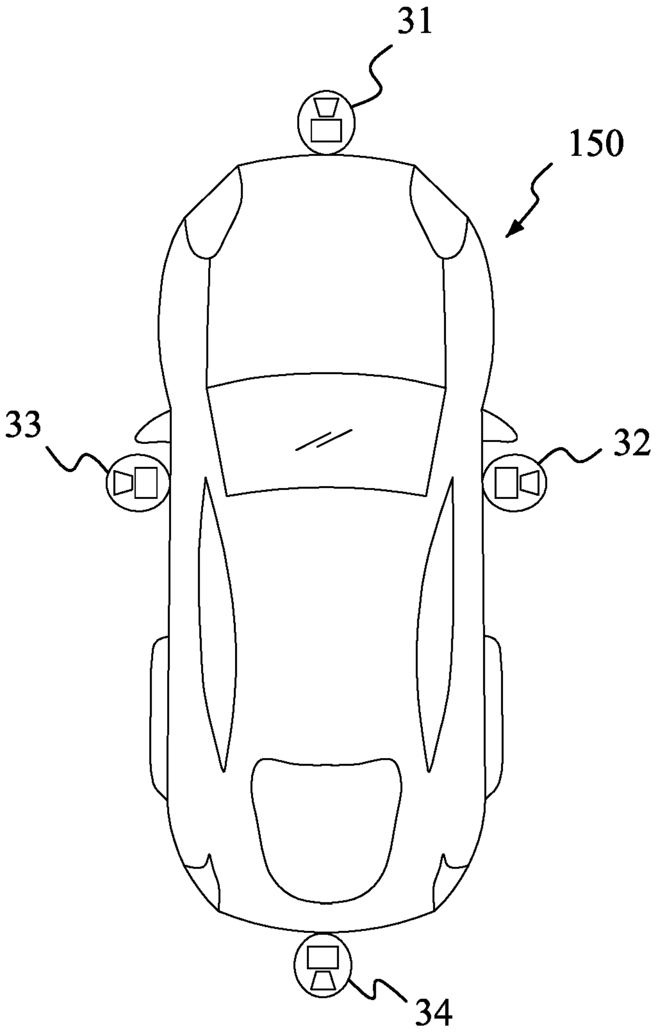
FIG. 2 is a schematic view showing installation positions of a vehicle camera module of the system for automatically recording and transmitting the parking space numbers and letters according to an embodiment of the present disclosure.

Refer to FIG. 2, which is a schematic diagram showing installation positions of the vehicle camera module 30 of the automatically recording and transmitting parking space numbers and letters system 100 of an embodiment of the present disclosure. The camera module 30 may include a front vehicle camera 31, a right side vehicle camera 32, a left side vehicle camera 33, and a rear vehicle camera 34. The front vehicle camera 31 is installed at the front of the vehicle 150 to capture images ahead of the vehicle 150. The right side vehicle camera 32 is installed at the right side of the vehicle 150 to capture images from the right side of the vehicle 150. The left side vehicle camera 33 is installed at the left side of the vehicle 150 to capture images from the left side of the vehicle 150. A rear vehicle camera 34 is installed at the rear of the vehicle 150 to capture images behind the vehicle 150. In other embodiments, the number of vehicle camera modules 30 may be increased or decreased, and the installation positions (e.g., the roof and/or the bottom of the vehicle) can be adjusted.

The artificial intelligence module 40 receives multiple vehicle surrounding images from the vehicle camera module 30, in order to establish a parking space recognition model according to the multiple vehicle surrounding images, and recognizes multiple characters corresponding to a part of the vehicle surrounding images of the multiple vehicle surrounding images according to the parking space recognition model. In some embodiments, the artificial intelligence module 40 may adopt deep learning object detection methods by inputting a large number of images containing parking space numbers and letters in advance and perform training, so as to establish a parking space recognition model. The artificial intelligence module 40 may recognize objects based on a neural network algorithm (for example, YOLO), region based convolutional neural networks (R-CNN), or fast R-CNN, but is not limited thereto. The artificial intelligence module 40 can be stored in non-volatile memory (for example, solid state drive (SSD), electrically programmable ROM (EPROM), electrically erasable programmable ROM (EEPROM), or read only memory (ROM)) to provide the data required for the control module 50 to read from or write to.

A character grouping module 42 is connected with the artificial intelligence module 40. The character grouping module 42 uses a grouping algorithm to group the multiple characters recognized by the artificial intelligence module 40 to form multiple sets of parking space numbers and letters corresponding to the part of the vehicle surrounding images. In other words, the character grouping module 42 is equivalent to a post-processing program for data processing, and can combine multiple characters into one or more parking space numbers and letters. In the process of grouping multiple characters, the distance between characters can be used for grouping.

The control module 50 is connected to the vehicle speed sensing module 10, the gear position sensing module 20, the vehicle camera module 30, the artificial intelligence module 40, the character grouping module 42, and the communication module 60. The control module 50 is used to determine whether to recognize the part of the vehicle surrounding images according to the vehicle speed information from the vehicle speed sensing module 10 and the gear position information from the gear position sensing module 20, so as to obtain multiple parking space numbers and/or letters. The control module 50 may also be used to determine a priority of multiple sets of parking space numbers and/or letters. In some embodiments, the control module 50 may determine the priority according to the number of times that multiple sets of parking space numbers and/or letters are recognized in a part of the vehicle surrounding images of multiple vehicle surrounding images. For example, the highest priority is determined by multiple sets of parking space numbers and letters that are recognized with the most times in a part of the vehicle surrounding images of the multiple vehicle surrounding images. In other embodiments, the control module 50 determines the priority according to the installation positions of the vehicle camera module 30 used by multiple sets of parking space numbers and letters in a part of the vehicle surrounding images of multiple vehicle surrounding images. For example, the highest priority is determined by the vehicle surrounding images captured by the front vehicle camera 31 or the rear vehicle camera 34. In other embodiments, the control module 50 determines the priority according to the time of multiple sets of parking space numbers and letters captured in a part of the vehicle surrounding images of multiple vehicle surrounding images. For example, the highest priority is determined by multiple sets of parking space numbers and letters that are captured at the longest time in a part of the vehicle surrounding images of the multiple vehicle surrounding images. In other embodiments, the control module 50 may determine the highest priority according to multiple sets of parking space numbers and letters that are captured at the most recent time (e.g., close to the current time) in a part of the vehicle surrounding images of the multiple vehicle surrounding images. After the vehicle 150 is turned off, the control module 50 transmits the parking space number with the highest priority of the multiple parking space numbers and letters to the communication module 60. The control module 50, for example, may be a general purpose microprocessor, special purpose microprocessor, field programmable gate array (FPGA), application-specific integrated circuit (ASIC), neural network accelerator, or other similar components or a combination thereof.

The communication module 60 is used to transmit the parking space number with the highest priority in the multiple sets of parking space numbers from the control module 50 to the user terminal 200. The communication module 60 can transmit a message including the parking space number to the user terminal 200 by means of wireless communication transmission, but is not limited thereto. The communication module 60 can support the Bluetooth communication standard, Wi-Fi communication standard, Zigbee communication standard, fourth generation (4G) cellular communication standard, fifth generation (5G) cellular communication standard, etc., but not limited thereto. In other embodiments, the communication module 60 may also transmit the message including the parking space number to the user terminal 200 by means of wired communication.

Figure 3:
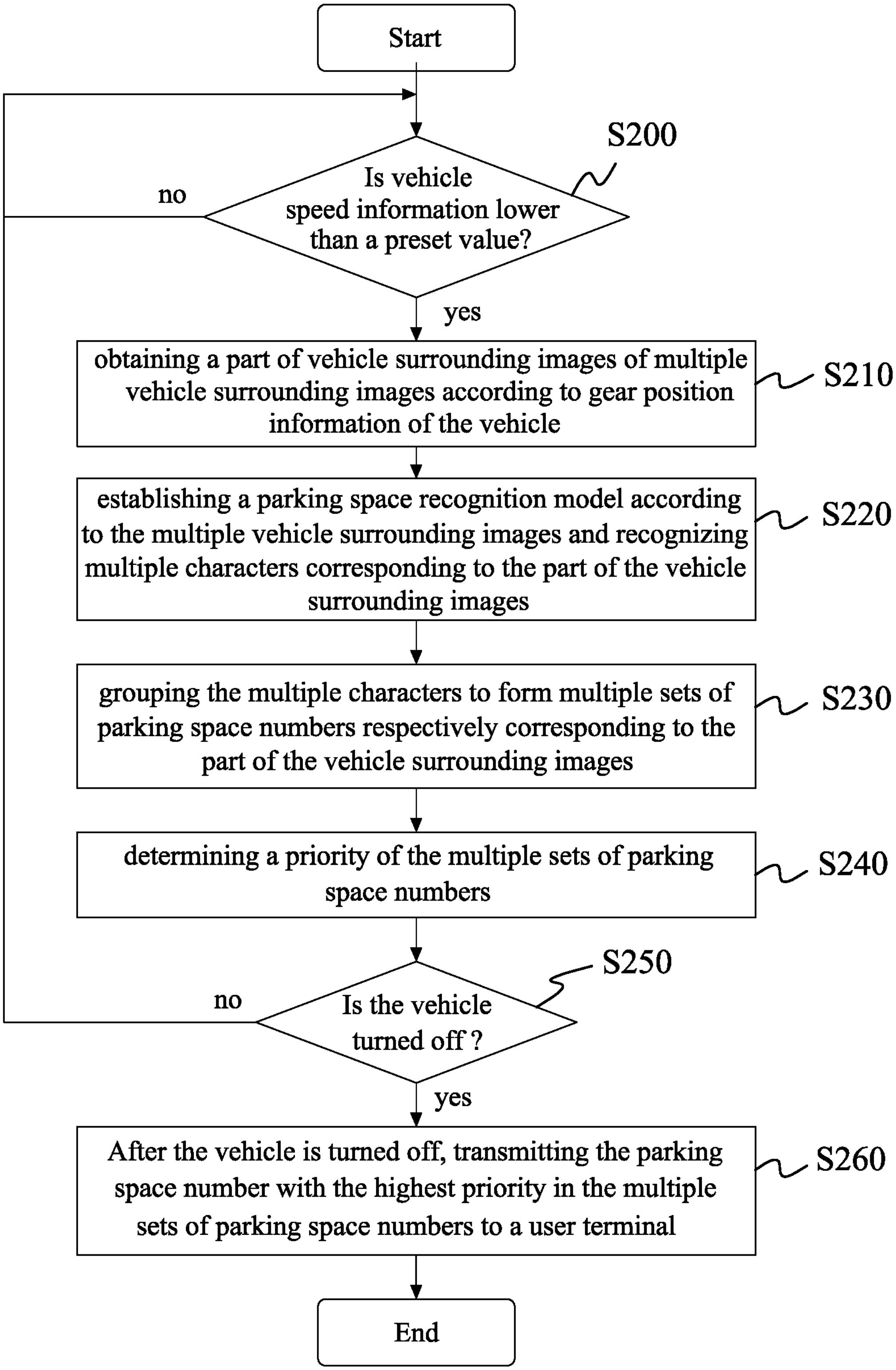
FIG. 3 is a flowchart illustrating a method for automatically recording and transmitting parking space numbers and letters executed by the system for automatically recording and transmitting parking space numbers and letters of an embodiment of the present disclosure.

Refer to FIG. 3, which is a flowchart illustrating a method for automatically recording and transmitting parking space numbers and letters executed by the automatically recording and transmitting parking space numbers and letters system 100 of an embodiment of the present disclosure. The steps in FIG. 3 can be performed by the system 100 for automatically recording and transmitting parking space numbers and letters.

In step S200, the control module 50 determines whether vehicle speed information from the vehicle speed sensing module 10 is lower than a preset value. The preset value, for example, may be 3 km/h-8 km/h, but is not limited thereto. The control module 50 may compare the vehicle speed information obtained by the vehicle speed sensing module 10 with the preset value to confirm whether the current driving speed of the vehicle 150 is lower than the preset value. When judged to be "no", that is, the vehicle speed information is greater than or equal to the preset value, the process repeats step S200, so that the control module 50 continues to judge whether the vehicle speed information of the vehicle 150 is lower than the preset value. When judged to be "yes", the process proceeds step S210.

In step S210, the control module 50 obtains a part of the vehicle surrounding images of the multiple vehicle surrounding images according to the gear position information from the gear position sensing module 20, and outputs it to the artificial intelligence module 40. For example, when the gear position information is D gear, the control module 50 may only obtain the vehicle surrounding images captured by the front vehicle camera 31 and the side vehicle cameras 32, 33, and not the vehicle surrounding image captured by the rear vehicle camera 34. When the gear position information is D gear, it can be judged that the vehicle 150 is not ready to park in the parking space (i.e., still in a status of looking for the parking space), the vehicle surrounding image obtained by the rear vehicle camera 34 for helping the calculation program of the recognition of the parking space number is "none" or "very low", so the control module 50 may not need to take the vehicle surrounding image obtained by the rear vehicle camera 34 into the calculation program of the recognition of the parking space number and letter, thereby reducing computing load on the control module 50. In other embodiments, when the gear position information is D gear, it may also only obtain the vehicle surrounding image captured by the front vehicle camera 31, and not the vehicle surrounding images captured by the rear vehicle camera 34 and the side vehicle cameras 32, 33.

In step S220, the artificial intelligence module 40 uses the parking space recognition model to recognize a part of the vehicle surrounding images of the multiple vehicle surrounding images obtained from the control module 50, in order to generate multiple characters corresponding to the part of the vehicle surrounding images and output to the character grouping module 42. Through the artificial intelligence module 40, a part of multiple vehicle surrounding images can be cropped, parsed, and recognized to obtain multiple characters including text, numerals, symbols, and/or labels. In other embodiments, the character may also contain a pattern or color.

In step S230, the character grouping module 42 groups multiple characters to form multiple sets of parking space numbers respectively corresponding to the part of the vehicle surrounding images and output to the control module 50. The multiple characters can be grouped by using a distance between each of the characters.

In step S240, the control module 50 determines the priority of multiple sets of parking space numbers and letters. In some embodiments, the priority may be determined according to the number of times that the multiple sets of parking space numbers and letters are recognized in the part of the vehicle surrounding images. Since the more times the multiple sets of parking space numbers and letters are recognized, means that the vehicle 150 may have selected the final parking space position, then the number of times that the multiple sets of parking space numbers and letters are recognized is used as a judgment condition. In some embodiments, the priority may be determined according to the installation positions of the vehicle camera module used by the multiple sets of parking space numbers and letters in the part of the vehicle surrounding images. Since the vehicle 150 will usually be parked in the parking space in a forward or reverse manner, the installation position of the vehicle camera (e.g., the front vehicle camera 31 or the rear vehicle camera 34) may be used as a judgment condition. In some embodiments, since each vehicle surrounding image records shooting time information of the time that the image is taken, the control module 50 may judge the sequence of each vehicle surrounding image according to the capture time information. The control module 50 determines the priority of the multiple sets of parking space numbers and letters according to the multiple shooting time information of the part of vehicle surrounding images respectively corresponding to the multiple sets of parking space numbers and letters. In some embodiments, the control module 50 determines the highest priority according to the multiple sets of parking space numbers and letters that are captured at the longest time or most recent in the part of the vehicle surrounding images. For example, when the vehicle 150 is parked in a parking space, and before the vehicle is turned off, the time of the parking space number and/or letter captured by the vehicle camera module 30 that is the most recent can judge that the parking space number captured represents the final parking position, therefore, the control module 50 sets the priority of the parking space number as highest. In other embodiments, the control module 50 may determine the highest priority according to the multiple sets of parking space numbers and letters that are captured at the most recent time in the part of the vehicle surrounding images.

In step S250, the control module 50 confirms whether the vehicle 150 is turned off. For example, the control module 50 may confirm whether the vehicle 150 is turned off according to a signal generated by an internal judgment circuit of the vehicle 150 after a driver turns off the vehicle 150, or the control module 50 may confirm whether the vehicle 150 is turned off according to a power-off signal generated by an internal judgment circuit of the vehicle 150 (taking an electric vehicle as an example) after the driver turns off the vehicle, but is not limited to the above method. When it is judged to be "no", the process returns to step S200. When it is judged to be "yes", the process proceeds to step S260.

In step S260, the control module 50 transmits the parking space number and/or letters with the highest priority in multiple sets of parking space numbers and letters to the user terminal 200 through the communication module 60. In other embodiments, the control module 50 may also decide whether to transmit the parking space number and/or letter with the highest priority in multiple sets of parking space numbers and letters to the user terminal 200 through the communication module 60 by the "P gear" of the gear position information.

Figure 4A:
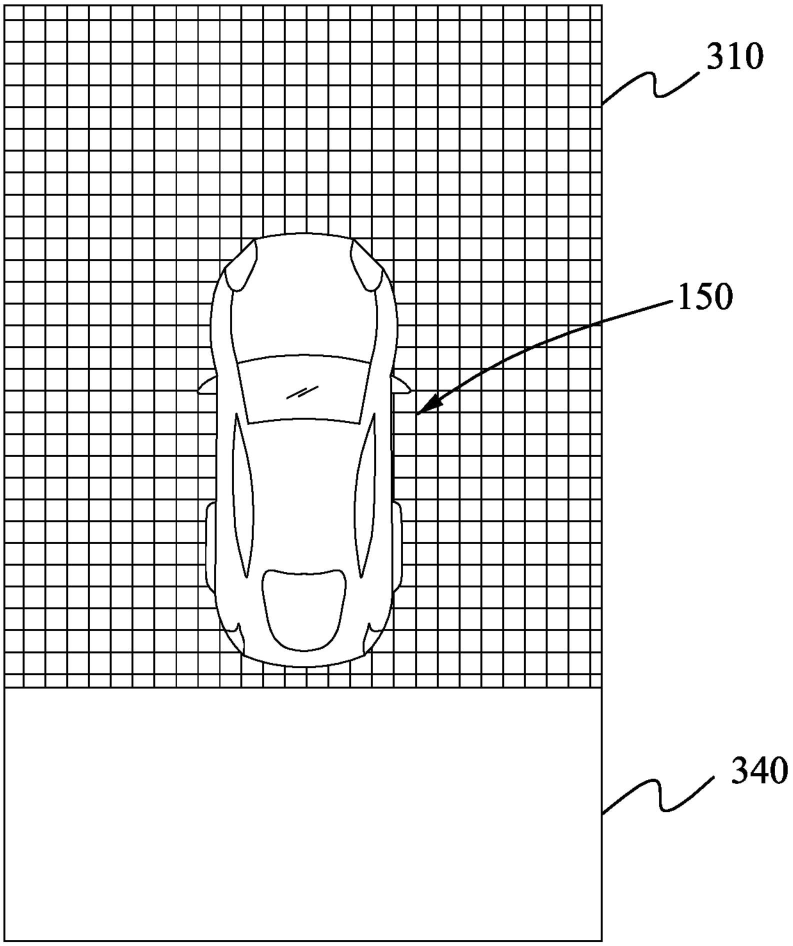
FIG. 4A is a schematic diagram of a system for automatically recording and transmitting parking space numbers and letters in order to obtain images of surroundings of a vehicle according to an embodiment of the present disclosure.

Refer to FIG. 4A, which is a schematic diagram of the automatically recording and transmitting parking space numbers and letters system 100 of an embodiment for obtaining the vehicle surrounding images. When the gear position information is D gear, the control module 50 may only obtain vehicle surrounding images corresponding to a first image range 310 captured by the front vehicle camera 31 and the side vehicle cameras 32, 33, and not the vehicle surrounding image corresponding to a second image range 340 captured by the rear vehicle camera 34. By reducing the amount of data of the vehicle surrounding images input to the control module 50, the computing load on the control module 50 is reduced, and the computing efficiency of the control module 50 is relatively improved.

Figure 4B:
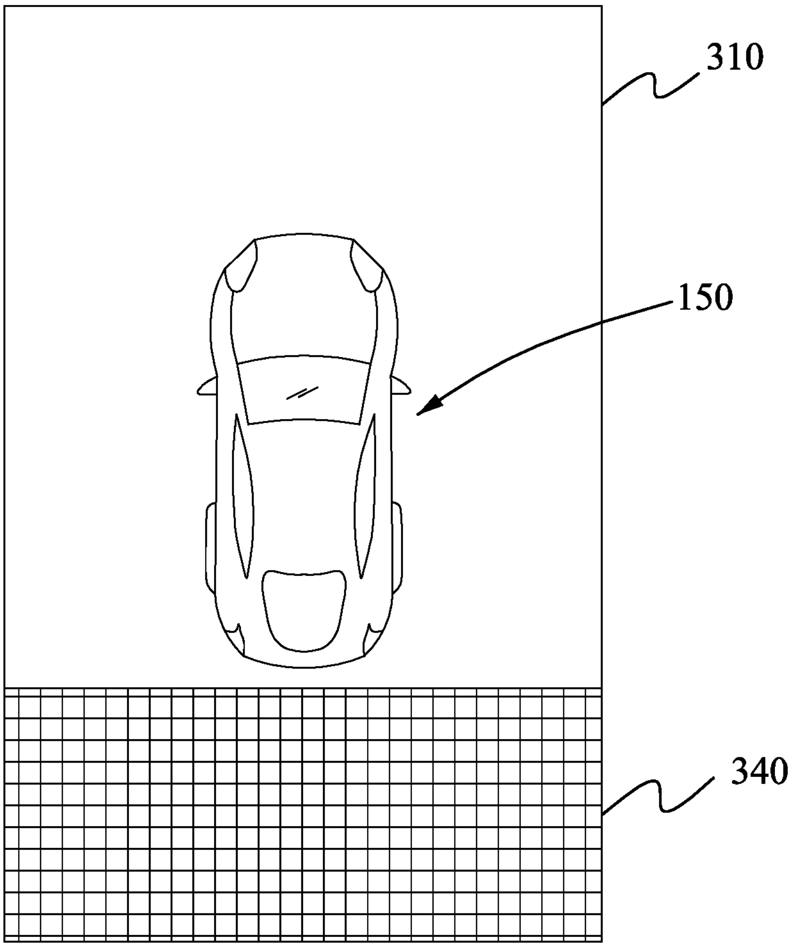
FIG. 4B is a schematic diagram of a system for automatically recording and transmitting parking space numbers and letters in order to obtain images of surroundings of a vehicle according to an embodiment of the present disclosure.

Refer to FIG. 4B, which is a schematic diagram of the automatically recording and transmitting parking space numbers and letters system of an embodiment for obtaining the vehicle surrounding images. When the gear position information is R gear, the control module 50 may only obtain vehicle surrounding images corresponding to a second image range 340 captured by the rear vehicle camera 34, and not vehicle surrounding images corresponding to a first image range 310 captured by the front vehicle camera 31 and the side vehicle cameras 32, 33. In other embodiments, it may also obtain only the vehicle surrounding images corresponding to an image range captured by the right side vehicle camera 32 or the left side vehicle camera 33, and the vehicle surrounding images corresponding to the second image range 340 captured by the rear vehicle camera 34 and/or the vehicle surrounding images corresponding to an image range captured by the front vehicle camera 31. Similarly, the above method of obtaining a part of the vehicle surrounding images of the multiple vehicle surrounding images may reduce the amount of data of the vehicle surroundings images input to the control module 50, thereby reducing the computing load on the control module 50 and relatively improving the computing efficiency of the control module 50.

Figure 5A:
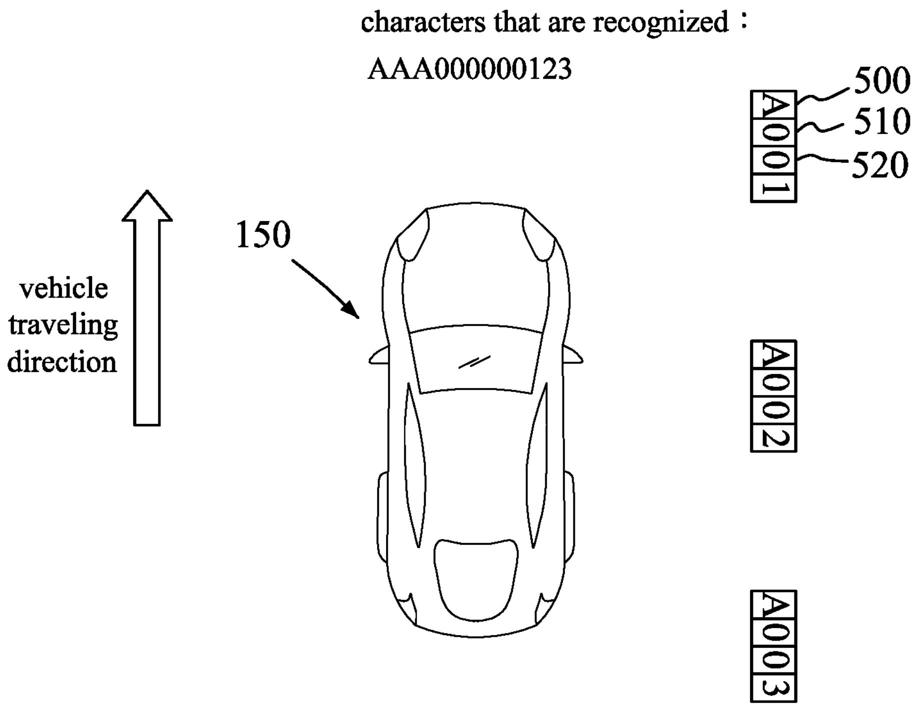
FIG. 5A is a schematic diagram illustrating a parking space numbers and letters recognition process according to an embodiment of the present disclosure.
Figure 5B:
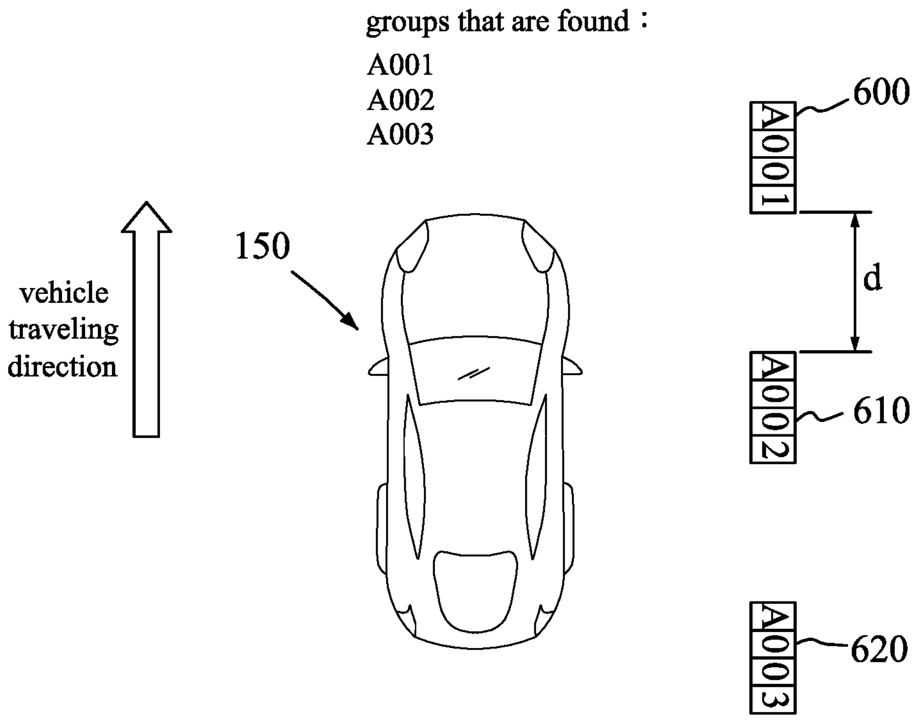
FIG. 5B is a schematic diagram illustrating a parking space numbers and letters recognition process according to an embodiment of the present disclosure.

Refer to FIGS. 5A and 5B, which are schematic diagrams illustrating a recognition process of the parking space number and letter of an embodiment of the present disclosure. As shown in FIG. 5A, the vehicle 150 travels in the direction indicated by the arrow. When the vehicle 150 drives past parking spaces, the control module 50 obtains a part of the vehicle surrounding images of multiple vehicle surrounding images through the vehicle camera module 30 according to the gear position information. Next, according to the aforementioned part of the vehicle surrounding images, the artificial intelligence module 40 recognizes the character 500 as "A", the character 510 as "0", and the character 520 as "0", and so on. Finally, the content of the multiple characters obtained is "AAA000000123". The artificial intelligence module 40 outputs the recognized characters to the character grouping module 40.

As shown in FIG. 5B, the character grouping module 40 may use a grouping algorithm to group multiple characters and output to the control module 50. For example, multiple characters are grouped by a distance d between each character to form the parking space number 600, 610, 620. Since each vehicle surrounding image records capture time information, therefore, the control module 50 may judge the sequence of each vehicle surrounding image according to the image capture time information. When the vehicle 150 drives past the parking space number 620, because the time of the parking space number 620 captured by the vehicle camera module 30 is earliest (i.e., the vehicle surrounding image first captured), and the time of the parking space number 610 captured by the vehicle camera module 30 is the second earliest, and the time of the parking space number 600 captured by the vehicle camera module 30 is the most recent (i.e., the vehicle surrounding image last captured). Thus, the parking space number 620 is temporarily set by the control module 50 to have a first priority, the parking space number 610 is set as a second priority by the control module 50, and the parking space number 600 is set as a third priority by the control module 50. The first priority is higher than the second priority, and the second priority is higher than the third priority.

When the vehicle 150 continues to drive to the parking space number 600, because the time of the parking space number 600 captured by the vehicle camera module 30 is the most recent, and the time of the parking space number 610 captured by the vehicle camera module 30 is the second most recent, and the time of the parking space number 620 captured by the vehicle camera module 30 is the oldest. Thus, the parking space number 600 is temporarily set by the control module 50 to have the first priority, the parking space number 610 is set as the second priority by the control module 50, and the parking space number 620 is set as the third priority by the control module 50.

When the vehicle 150 finally selects to park at the position of the parking space number 600 and is turned off, the control module 50 transmits the parking space number 600 having the first priority to the user terminal 200 (e.g., a smartphone) via the communication module 60. Accordingly, the driver can check the above information through the smartphone to know the parking space number 600 of the vehicle 150, so as to solve the problem that the driver forgets where the vehicle 150 is parked. Further, in other embodiments, the control module 50 may also determine the priority according to the number of times that parking space numbers are recognized in the vehicle surrounding images or the installation positions of the vehicle camera module used.

In summary, in the method and system for automatically recording and transmitting parking space numbers and letters, the control module 50 may determine the priority according to the number of times that parking space numbers are recognized in the vehicle surrounding images, the time that the parking space numbers are captured, or the installation positions of the vehicle camera module, and after the vehicle 150 is turned off, the parking space number with the highest priority in the parking space numbers is transmitted to the user terminal through the communication module 60, thereby solving the problem that the driver forgets where the vehicle 150 is parked. Further, the control module 50 may obtain the part of vehicle surrounding images according to the gear position information, so as to decrease the amount of data of the vehicle surrounding images input to the control module 50, thereby reducing the computing load of the control module 50 and relatively improving the computing efficiency of the control module 50.

While the present invention has been described by means of preferable embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A method for automatically recording and transmitting parking space numbers, executed by a system for automatically recording and transmitting parking space numbers, comprising the following steps:

judging whether vehicle speed information of a vehicle is lower than a preset value;

when it is confirmed that the vehicle speed information is lower than the preset value, obtaining a part of vehicle surrounding images of multiple vehicle surrounding images according to gear position information of the vehicle;

establishing a parking space recognition model according to the multiple vehicle surrounding images and recognizing multiple characters corresponding to the part of the vehicle surrounding images;

grouping the multiple characters to form multiple sets of parking space numbers respectively corresponding to the part of the vehicle surrounding images;

determining a priority of the multiple sets of parking space numbers; and after the vehicle is turned off, transmitting the parking space number with the highest priority in the multiple sets of parking space numbers to a user terminal.

2. The method according to claim 1, wherein the multiple characters are grouped by using a physical distance between each character.

3. The method according to claim 1, wherein the priority is determined according to a number of times that the multiple sets of parking space numbers are recognized in the part of the vehicle surrounding images.

4. The method according to claim 1, wherein the priority is determined according to installation positions of a vehicle camera module used by the multiple sets of parking space numbers in the part of the vehicle surrounding images.

5. The method according to claim 1, wherein the priority is determined according to a time that the multiple sets of parking space numbers are captured in the part of the vehicle surrounding images.

6. A system for automatically recording and transmitting parking space numbers, comprising:

a vehicle speed sensing module, used to sense a driving speed of a vehicle to obtain vehicle speed information;

a gear position sensing module, used to sense a gear of the vehicle to obtain gear position information;

a vehicle camera module, installed on the vehicle to obtain multiple vehicle surrounding images;

an artificial intelligence module, connected with the vehicle camera module to establish a parking space recognition model according to the multiple vehicle surrounding images, and recognize multiple characters corresponding to a part of the vehicle surrounding images of the multiple vehicle surrounding images;

a character grouping module, connected with the artificial intelligence module to group the multiple characters to form multiple sets of parking space numbers corresponding to the part of the vehicle surrounding images;

a control module, connected with the vehicle speed sensing module, the gear position sensing module, the vehicle camera module, the character grouping module, and the artificial intelligence module to determine a priority of the multiple sets of parking space numbers; and a communication module, connected with the control module to transmit a parking space number with the highest priority in the multiple sets of parking space numbers to a user terminal.

7. The system according to claim 6, wherein the character grouping module groups the multiple characters by using a distance between each character.

8. The system according to claim 6, wherein the priority is determined according to the number of times that the multiple sets of parking space numbers are recognized in the part of the vehicle surrounding images.

9. The system according to claim 6, wherein the priority is determined according to installation positions of the vehicle camera module used by the multiple sets of parking space numbers in the part of the vehicle surrounding images.

10. The system according to claim 6, wherein the priority is determined according to the time that the multiple sets of parking space numbers are captured in the part of the vehicle surrounding images.

* * * * *